April 7, 1953 C. V. EDWARDS 2,633,685
POTATO HARVESTER
Filed July 29, 1946 6 Sheets-Sheet 1

Fig. 1.

INVENTOR.
CURTIS V. EDWARDS
BY
ATTORNEY

April 7, 1953 C. V. EDWARDS 2,633,685
POTATO HARVESTER
Filed July 29, 1946 6 Sheets-Sheet 3

INVENTOR.
CURTIS V. EDWARDS
BY
ATTORNEY

April 7, 1953  C. V. EDWARDS  2,633,685
POTATO HARVESTER

Filed July 29, 1946  6 Sheets-Sheet 5

INVENTOR.
CURTIS V. EDWARDS
BY Jesse P. Whann
ATTORNEY

April 7, 1953    C. V. EDWARDS    2,633,685
POTATO HARVESTER

Filed July 29, 1946    6 Sheets-Sheet 6

INVENTOR.
CURTIS V. EDWARDS
BY *Jesse P. Whann*
ATTORNEY

Patented Apr. 7, 1953

2,633,685

UNITED STATES PATENT OFFICE 2,633,685

POTATO HARVESTER

Curtis V. Edwards, Yakima, Wash., assignor, by mesne assignments, to Deere & Company, Moline, Ill., a corporation of Illinois Application July 29, 1946, Serial No. 687,033

6 Claims. (Cl. 55—9)

This invention relates to improvements in potato harvesters and relates in particular to a potato harvester adapted to be moved through the field which is ready for harvesting, which will dig up the potatoes and the vines and separate the vines from the potatoes, after which the potatoes are elevated to a conveyor belt leading to holders for sacks into which the potatoes are delivered.

An object of the invention is to provide in a harvester of this character a digging mechanism having a novel depth control capable of ready adjustment by an operator who stands on a platform above the front end of the digging mechanism, to meet the varying conditions which are encountered, and in addition to the adjusting mechanism having a hydraulic control which is likewise operated from the platform. Among the conditions met in the use of the harvester are the different types of soil, the variations in contour or levelness, and also the height above the furrow bottoms of the hills from which the potatoes are to be harvested.

An object of the invention is to provide in a depth control mechanism a linkage arrangement whereby ground-engaging wheels are supported by independent arms ahead of the digger bits or prongs, there being means whereby the wheels and the front end of the digging mechanism have different rates of vertical travel, as the result of the operation of the interconnecting linkage mechanism. The purpose of this difference in vertical movement of the depth controlling wheels of the digger bits is to compensate for the difference in height resulting from the dropping of the wheels into holes or the traveling of the wheels over humps. In the operation of the device, the manual adjustment may be employed to change the horizontal planes in which the depth control wheels and the digger bits operate, but this adjustment is accomplished without affecting the relative difference in vertical movement of the wheels and the digger bits.

A further object of the invention is to provide in a potato harvester of this character a digger mechanism having a frame which is hinged at its upper end to the vehicle chassis and slopes downwardly in forward direction toward the ground, there being digger bits or teeth projecting forwardly which scoop up the potato-containing soil.

The invention further provides an arrangement whereby the levers which support the depth controlling wheels have the rear ends thereof supported on vertically adjustable pivots and have intermediate points thereof connected to the frame of the digger mechanism so that vertical movement of the wheels, as a result of dropping into the holes or riding over humps, transmits to the digger mechanism a vertical swinging movement which is different than the vertical swinging movement of the levers.

A further object of the invention is to provide a simplified and improved chain belt which extends over suitable guide rollers or sprockets from the lower end of the digging mechanism to an improved vine-removing device for separating the vines from the potatoes so that they may drop onto a transverse conveyor of reticulated form to an elevator which delivers the potatoes to a novel and effective form of cleaning mechanism. This cleaning mechanism in turn delivers the potatoes to a horizontal conveyor or sorting belt which carries the potatoes to the rear of the harvester and ultimately delivers the potatoes into sacks. Platforms are provided on the vehicle on which workers stand, whose duties include sorting from the potatoes, rocks, clods, and other debris.

It is an object of the invention to provide a vine-removing device having vine-engaging parts traveling at a relatively high rate of speed as compared to the speed of the chain belt, to engage and jerk the vines from the potatoes, the inertia of which tends to resist change in the rate of travel of the potatoes so that the fast movement of the vines produced by the vine-removing device results in the pulling of the vines from the potatoes.

A further object of the invention is to provide a vine-removing device consisting of revolving members having projections in the form of resilient fingers or spikes placed relatively close together and being adapted to engage the vines as the vines and the potatoes pass rearwardly from the rear end of the chain belt conveyor.

A further object is to provide a vine-removing device wherein the projecting fingers are made of rubber and wherein the upper rotary member of the vine-removing device is set forwardly of the lower rotary part of the vine-removing device, the result being that the upper rotary member tends to throw the potatoes downwardly so that none of them will strike the upper portion of the lower rotary part of the vine-removing device and thereby avoid the carrying of potatoes into the gap between the upper and lower rotary members of the vine-removing device wherein they would be crushed.

A further object of the invention is to provide in conjunction with the digger mechanism a vine draper which will engage the vines from above and carry them rearwardly up and beyond the rear end of the inclined portion of the digger mechanism. A further object of the invention is to provide a means for disposing the vines on the chain belt in such position that the vines extend rearwardly from the potatoes to which they are attached, the result being that the vines are brought into engagement with the vine-removing device before the thereto attached potatoes reach the rear end of the chain belt conveyor which extends from the rear ends of the digging bits to the vine-removing device.

The means referred to in the preceding paragraph, in the present embodiment of the invention, consists in the vine draper which provides rearwardly moving members in spaced relation to the link belt, these members traveling rearward at a speed greater than the speed of the chain belt so that the vines are moved rearward at a speed greater than that which the potatoes are moved, the effect being to dispose the vines in positions rearwardly of the potatoes to which they are attached.

A further object of the invention is to provide a cleaning device to receive the potatoes, such cleaning device comprising a set of rollers disposed on substantially parallel, horizontal axes arranged so as to correspond to an inclined plane, these rollers being rotated so that the exposed surfaces thereof revolve in upward direction and have resilient projections which engage the potatoes as they move from the upper to the lower end of the inclined cleaning device. A feature of the invention is that these cleaning rollers cause the potatoes to roll so that the resilient projections on the rollers can remove dirt effectively from the potatoes and disintegrate clods which may adhere to the potatoes. Also, the projections on the cleaning rollers effectively carry off small vine portions, grass and leaves, not previously separated from the potatoes.

A further object of the invention is to provide a means for rotating each upwardly succeeding roller of the potato cleaning mechanism at a slightly greater speed than the preceding roller so that vines will not be wrapped around the cleaning rollers. Since each upwardly succeeding roller travels at slightly increased speed, the vines or trash are stripped off from the adjacent roller.

A further object of the invention is to provide a harvester having supporting wheels adjustable as to width, and so arranged that the device may be turned on a very short radius. A further object of the invention is to provide a steering connection between the front and rear wheels which contributes to this short turning radius.

Further objects and advantages of the invention will be brought out in the following part of the specification.

Referring to the drawings, which are for illustrative purposes only:

Fig. 6 is an enlarged fragmentary section taken as indicated by the line 6—6 of Fig. 3;

Fig. 7 is an enlarged fragmentary section taken as indicated by the line 7—7 of Fig. 3;

The harvester includes a chassis 10 supported by front and rear wheels 11 and 12. The chassis includes side frame members 13 which are brought together at their forward ends. An engine 14 for operation of the mechanism of the harvester is mounted on the forward portion of the chassis 10, there being a transmission gear box 15 extending rearwardly from the engine and having a power output shaft 16 connected to a speed reducing gear 17. This speed reducing gear 17, through a safety clutch 18, drives a power input shaft 19 of an angle gear 20 having a transverse power output shaft 21 on which a sprocket 22 is mounted so as to drive a chain 23 whereby power is carried to parts of the mechanism to be hereinafter described.

Plates 24 extend downwardly from the side frame members 13 and from the lower ends of the plates 24 chassis frame members 25 are extended rearwardly, these chassis frame members being connected to the rear ends of the frame members 13 by posts 26. A digger frame 27 has its rear end connected to the plates 24 by a shaft 28 and from this shaft 28 the digger frame 27 slopes downwardly and at its forward end has a series of forwardly projecting tines or bits 29 for engaging the ground and lifting the potatoes, vines and entrained soil onto a flexible grid conveyor 30 which is trained over special cone rollers 31 supported at the forward end of the digger frame 27 and the upper run 30a of which conveyor extends over a series of sprockets 32, 33 and 34 to sprockets 35 disposed adjacent to the vines-removing mechanism of the device. The lower run 30b of the flexible grid conveyor 30 passes back over idler sprockets 36 to the cone rollers 31. The sprockets 35 are mounted on a transverse shaft 37 carrying large sprockets 38 over which the drive chain 23 is trained, so that the sprockets 35 may be driven in a direction to pull the upper run 30a of the flexible grid conveyor 30 upward from the rollers 31.

A vine draper 39 is provided for draping the vines rearwardly from the potatoes to which they are attached, so that when the upper rear end of the travel of the upper run 30a of the flexible grid conveyor 30 is reached, the vines will arrive at the vine-removing device R ahead of the potatoes. This vine draper comprises a traveling chain or belt 40 arranged above the flexible grid conveyor 30 and has downwardly projecting rubber or rubber-covered members 41 for engaging the vines and dragging them rearwardly. This rearward dragging or draping of the vines is accomplished by running the belt 40 at a higher rate of speed than the conveyor 30. Good vine draping results are accomplished by driving the belt 40 at a speed 10 to 15 percent greater than the speed of the conveyor 30. For example, the conveyor 30 may have a travel of 275 feet per minute and the travel of the belt 40 of the vine draper may be 305 feet, approximately, per minute.

The vine draper belt 40 is preferably of chain type and runs over front sprockets 42 and rear sprockets 43. The sprockets 42 are carried at the front end of a vine draper frame 44 which has its intermediate portion resting on adjustable supports 45 and has its rear end carried by a stub bearing shaft 46. The rear sprockets 43 of the vine draper are carried on a transverse shaft 47 having thereon larger sprockets 48 over which the lower portion 23a of the chain 23 passes, whereby the driving of the chain, as indicated by arrows 49, will rotate the sprockets 35 in counterclockwise direction and rotate the sprockets 43 in clockwise direction.

Figure 1:
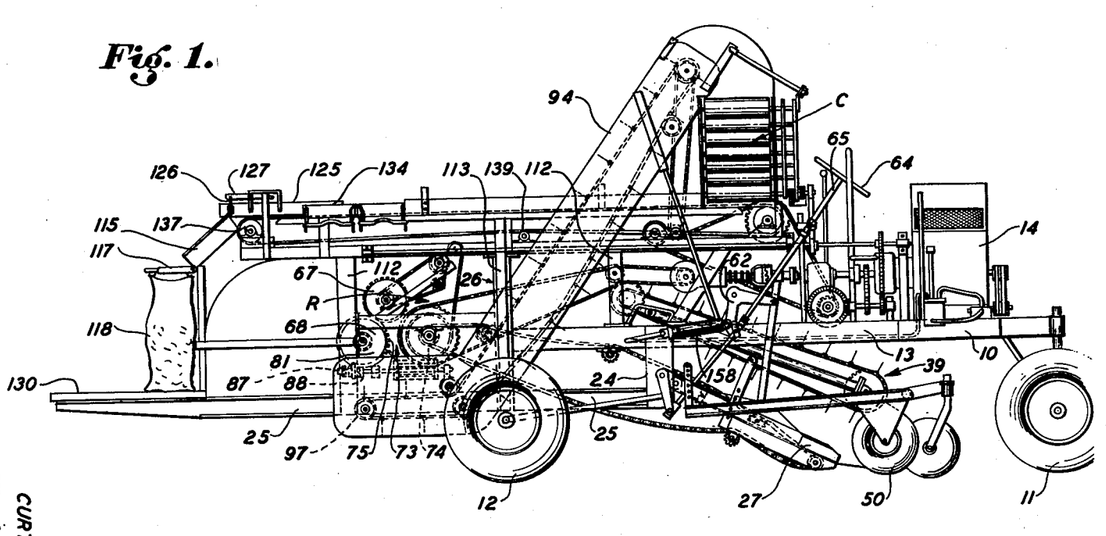
Fig. 1 is a side elevation, to reduced scale, of a preferred form of my invention.
Figure 3:
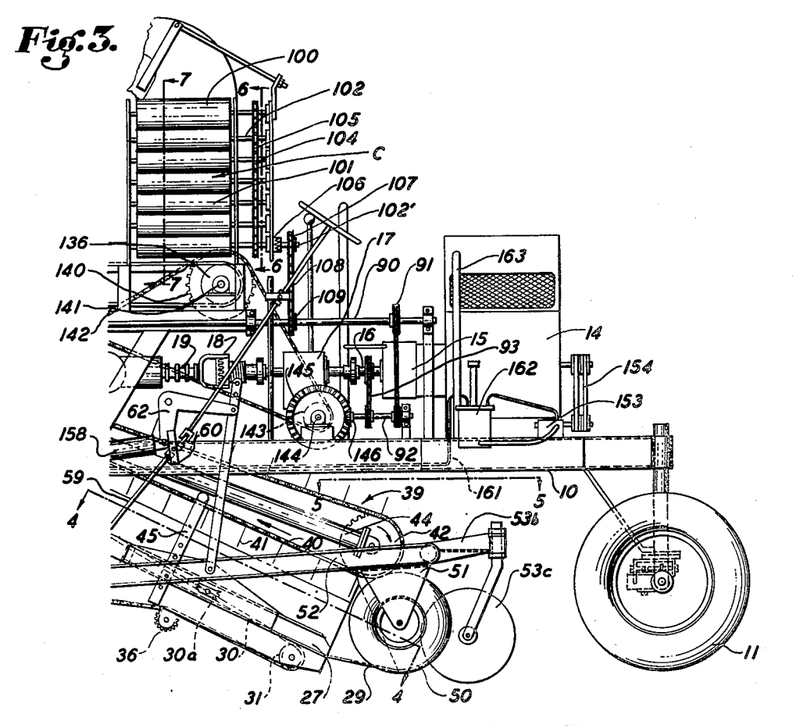
Fig. 3 is an enlarged elevational view of the front portion of the harvester shown in Fig. 1.
Figure 4:
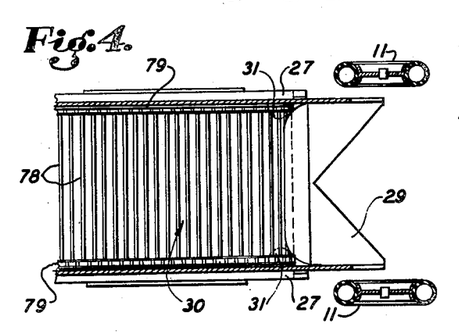
Fig. 4 is a fragmentary section taken as indicated by the line 4—4 of Fig. 3.
Figure 5:
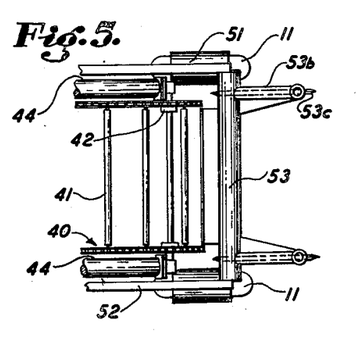
Fig. 5 is a fragmentary plan view taken as indicated by the line 5—5 of Fig. 3.
Figure 13:
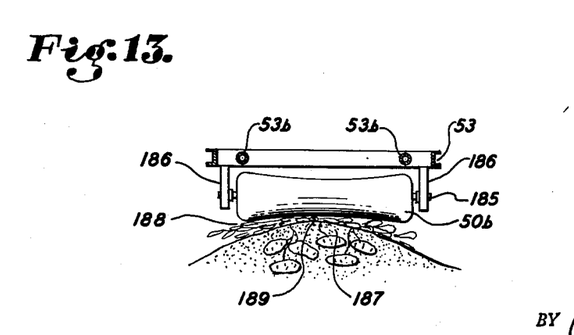
Fig. 13 is a fragmentary view showing the depth control roller employed under some conditions; and, Fig. 14 is an enlarged fragmentary view of the mechanism included in the circle c of Fig. 8.

During the operation of the harvester over the ground, the position of the digger bit or blade 29 is determined by depth control means consisting either of a roller 50a, shown in Fig. 13, or the wheels 50, shown in Figs. 1 and 3, which engage the bottoms of the furrows between the potato hills or mounds, these wheels being disposed on the opposite sides of the forward ends of the digger bit 29. The wheels 50 are supported by brackets 51 which project downwardly from the forward ends of side bars 52 forming part of a U-shaped frame 53. The side bars 52 are pivotally connected to the digger frame 27 by pins 15' spaced from the rear ends of the side bars 52, and the rear ends of the side bars are connected by links 55 with the forward ends of lever arms 56 keyed on the transverse shaft 28. It will be perceived that as the lever arms 56 are swung upwardly, the pull exerted through the links 55 will tend to swing the forward ends of the side bars 52 downward with relation to the front ends of the digger bits 29, or, on the other hand, if the wheels 50 are in engagement with the ground, the upward swinging of the lever arms 56 will pull the rear ends of the side bars 52 upward, thereby moving the pins 15' upward and thereby lifting the digger frame 27 so that the digger bit 29 will be moved upward relatively to the wheels 50.

The swinging of the lever arms 56 for the purpose of raising or lowering the wheels 50 with relation to the digger bits 29 is accomplished through swinging movement of a control lever 57 which is fixed on the shaft 28 and has at its lower end an internally threaded sleeve 58 which receives the lower threaded end of a rod 59, the upper end of which has thrust bearings 60 engaging a block 61 turnably mounted on the lower end of a lever 62 which is swingable on a shaft 63. Rotation of the lever 57 so as to swing the lever arms 56 is accomplished through a depth control hand wheel 64 connected by a shaft 65 and a flexible coupling 66 with the upper end of the rod 59. An operator, standing on the forward part of the vehicle chassis, may watch the operation of the digger mechanism and may adjust the digger bits 29 vertically with relation to the wheels 50 as required by operating conditions encountered. When the wheels 50 are moved vertically, due to deviations in the level of the ground over which they travel, the digger bits 29 will move but little as compared to the vertical movement of the wheels due to the action of the linkage connection between the side bars 52 and the digger frame 27. Accordingly, vertical movement of the wheels 50, as they ride over the ground, will not cause a great change in the level to which the digger bits 29 have been adjusted. Tubular arms 53b project forwardly from the frame member 53 to support coulters 53c in positions to cut off laterally extending portions of vines.

The vine-removing device R comprises upper and lower rollers 67 and 68 mounted respectively on shafts 69 and 70 on which sprockets 71 and 72 are fixed. The lower roller 68 is disposed rearwardly of and parallel to the shaft 37, around which the rear end of the conveyor 30 travels, so that a space 73 is provided between the rear end 74 of the conveyor and the front face 75 of the lower roller 68. The upper roller 67 is disposed above and forwardly of the lower roller 68 so that the lower portion of the upper roller 67 lies above the space 73.

The surfaces of the rollers 67 and 68 are provided with projecting fingers or nubs 76 of flexible character. In the preferred practice of the invention, the rollers 67 and 68 are surfaced with a layer of rubber having rubber fingers projecting therefrom, these fingers intermeshing as shown. The rollers are driven at relatively high speed as compared to the travel of the conveyor 30. For example, these rollers 67 and 68 may have a surface speed of approximately 1250 feet per minute as compared to the 275 feet per minute travel of the conveyor 30. As the vines pass from the rear end 74 of the conveyor 30, where it passes around the sprockets 35, they are engaged by the fingers 76 of the upper roller 67 and/or by the fingers 76 of the lower roller 68 so that such vines will be drawn at high velocity rearwardly between the upper and lower rollers 67 and 68, and will be jerked away from the potatoes to which they are attached. Some of these detached potatoes will drop directly downwardly upon a lateral grid conveyor 77, and other of the potatoes may be drawn against the surfaces of the rollers 67 and 68, from whence they will drop onto the conveyor 77. A feature of the vine-removing device R resides in the placing of the upper roller 67 ahead of the lower roller so that potatoes which may be thrown against the lower forward portion of the upper roller 67 will be deflected downwardly through the space 73 or downwardly and rearwardly against the front face 75 of the lower roller 68, from which the potatoes then drop downwardly onto the transverse conveyor 77. The conveyors 30 and 77 comprise parallel bars 78 connected at their ends by links 79. The conveyor 77 travels over a pair of sprockets 80 and a pair of cone rollers 31a. The bars 78 of the conveyors 30 and 77 provide grids on which the potatoes are supporting and carried, and have spaces through which debris, such as soil, small clods, etc., may fall to the ground.

Figure 8:
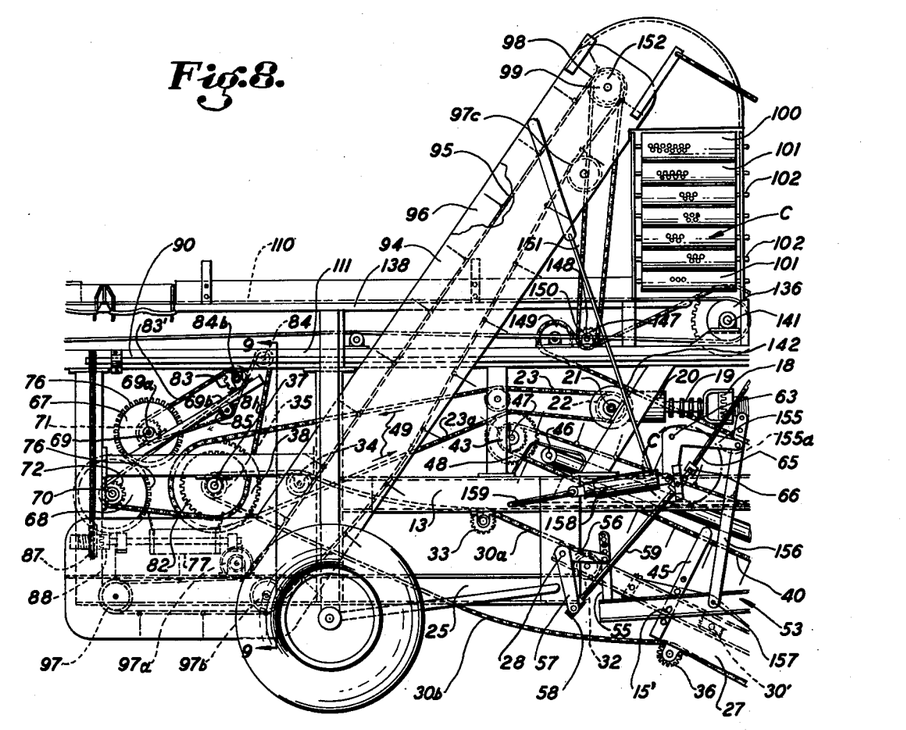
Fig. 8 is an enlarged elevation of the middle portion of the device.
Figure 9:
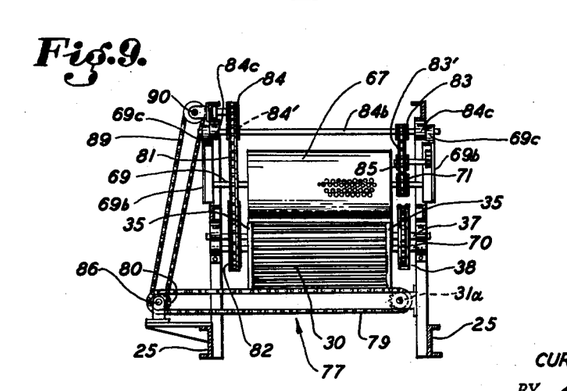
Fig. 9 is a fragmentary sectional view taken as indicated by the line 9—9 of Fig. 8.
Figure 10:
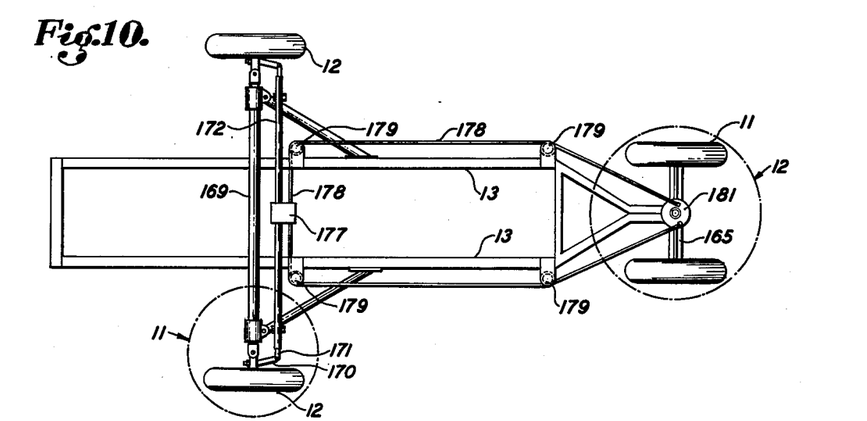
Fig. 10 is a schematic plan view of the chassis, showing the adjustability of the rear wheels and the steering connections.
Figure 11:
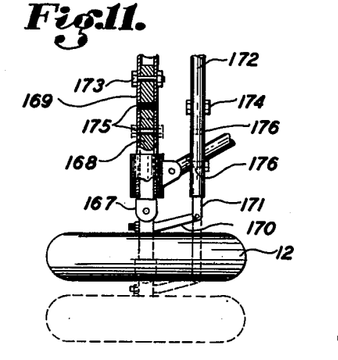
Fig. 11 is an enlarged fragmentary sectional view of the portion of Fig. 10 included in the circle 11.
Figure 12:
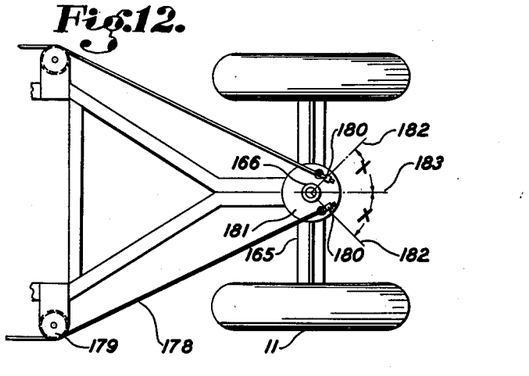
Fig. 12 is an enlarged plan view of the portion of Fig. 10 included in the circle 12.

To drive the rollers 67 and 68, respectively, in clockwise and counterclockwise directions, a chain loop 81 is threaded, as shown in Figs. 8 and 9, over a sprocket 82 which is fixed on the shaft 37, the sprocket 72 associated with the roller 68, and over an idler 84 to drive the roller 68 in counterclockwise direction. The chain 81 engages a sprocket 84' which is fixed on a shaft 84b, Figs. 8 and 9, which is supported by spaced bearings 84c, the shaft 84b being thereby driven in clockwise direction. A sprocket 83 is fixed on the shaft 84b and drives a chain loop 83' which extends around a sprocket 71, associated with the roller 67, and around an idler 85, thereby driving the roller 67 in clockwise direction. The lower roller 68 may be driven at a greater surface velocity than the roller 67, thereby providing a shearing or frictional action between the upper and lower rollers 67 and 68 which will prevent vines from becoming wound around these rollers. The transverse shaft 69 is supported by bearings 69a on members 69b which may swing upwardly, thereby giving the roller 67 a floating support with relation to the roller 68. The upper ends of the members 69b are swung from the ends of the shaft 84b by blocks 69c.

The transverse conveyor 77 has a shaft 86 on which the sprockets 80 are fixed, and this shaft 86 is driven from a sprocket 87 through a torque-limiting or safety clutch 88. The sprocket 87 is driven by a chain 89 from a shaft 90 which extends to the front portion of the chassis 10 where it is connected by chain and sprocket means 91 with a jack shaft 92 which is in turn driven by chain and sprocket means 93 from the power output shaft 16 of the engine 14.

From the transverse conveyor 77 the potatoes are delivered to an elevator 94 which is mounted on the side of the chassis. This elevator comprises a belt member 95 having spaced rubber-covered flights 96. The belt member 95 is of link type and runs around cone rollers 97, under guide sprockets 97a and 97b, over guide sprockets 97c, and around drive sprockets 98 mounted on a transverse shaft 99 at the upper portion of the elevator 94, and driven in clockwise direction by means which will be later described.

Figures 6, 7, 14:
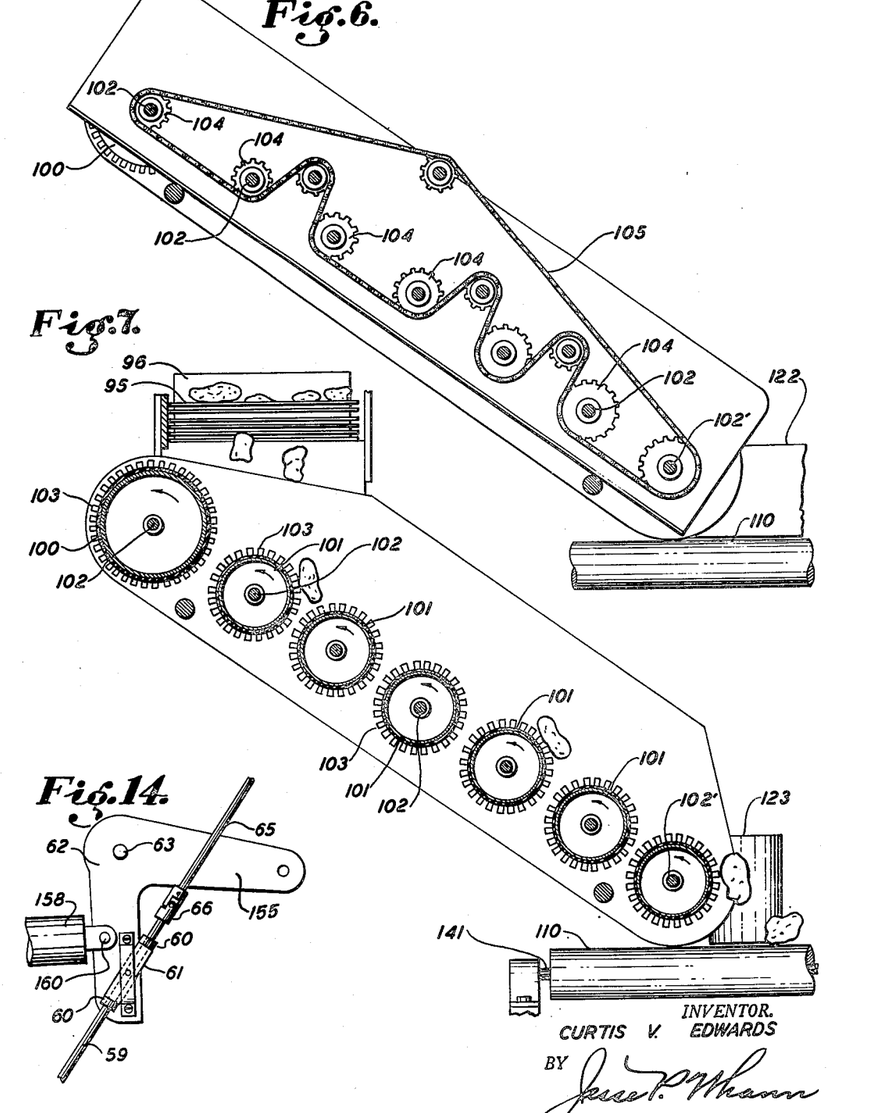

The elevator 94 delivers the potatoes to the upper end of a cleaning device C comprising an upper roll 100 and downwardly succeeding rolls 101. The rolls 100 and 101 are mounted on horizontal shafts 102 which are parallel and are disposed in a sloping plane. This sloping plane has an inclination of approximately 35 degrees to horizontal and the rolls 100 and 101 are accordingly disposed in downwardly stepped relation as shown in Figure 7. The rolls 100 and 101 have rubber-covered surfaces from which small nubs 103 project, these nubs acting to clean the surfaces of the potatoes as they travel down the cleaning device C, and also serving as means for carrying off debris, such as small portions of vines, twigs, and dirt, outwardly between the rolls. The rolls 100 and 101 are all rotated in such direction that the surfaces thereof engaged by the potatoes move in a general upward direction. As viewed in Figure 7, these rolls rotate in counterclockwise direction and therefore as the potatoes engage the rolls and tend to travel downward, they are given rolling action so that the rubber nubs 103 are brought into engagement with substantially the entire surfaces of the potatoes to perform an effective cleaning action. If a potato strikes an upper part of a roll 100 in a manner to be thrown into engagement with the next roll above, the surface of the upper roll, moving outwardly from the space between it and the roll on which the potato lies, will throw the potato forwardly. Also, each upwardly succeeding roll has a greater peripheral velocity than the roll preceding the same so that it is not possible for a large potato to pass through the spaces between the rolls. The only potatoes which may pass through the spaces between the rolls are those which have a dimension less than the gaps between the rolls. Any larger potato, which is carried on a roll toward the gap between such roll and the next upwardly succeeding roll, will be engaged by the periphery of the upwardly succeeding roll which is traveling at a higher velocity than the periphery of the roll which is tending to move the potato toward the gap. Therefore, the potato will be impelled or rolled away from the gap. The rolls 101 are of the same diameter, and the upper roll 100 is of considerably larger diameter for the purpose of providing at the upper end of the cleaning device C a roller surface of considerable vertical dimension to act as a stop against further movement of any potato which is thrown upwardly toward the upper end of the cleaning device.

The shafts 102 supporting the rolls 100 have thereon sprockets 104 which are gradually decreased in size from the lowermost shaft to the uppermost shaft of the group of shafts 102. For example, each upwardly succeeding sprocket 104 may have one less tooth than its preceding sprocket 104. A chain 105 runs over these sprockets 104 to act as an interconnecting and driving means. The driving of all of the shafts 102 is accomplished by driving one of them; for example, the lowermost shaft indicated at 102' is driven through a torque-limiting or safety clutch 106 from a sprocket 107 driven through a chain 108 from a drive sprocket 109 fixed on the longitudinal shaft 99.

From the cleaning device C the potatoes are delivered onto the forward portion of a horizontal conveyor 110 supported in a frame structure 111 mounted on the chassis and being connected thereto by posts 26, 112, and 113, and other frame and bracing members shown. The conveyor 110 is positioned so that its upper portion constitutes a rearwardly traveling table, open or closed type, which carries the potatoes rearwardly on the harvester to delivery chutes 114 and 115 leading to sack-holding devices 116 and 117, each of which is adapted to hold a potato sack 118 as shown in Figure 1. The conveyor 110 is divided into lanes 119, 120, and 121 by dividing walls 122 and 123. At the rear ends of the walls 122 and 123 hinges 124 connect thereto swinging guide walls 125 which converge rearwardly and are connected by a link 126 to which a shifting lever 127 is attached, the forward portion of this shifting lever 127 being adapted to engage a cross bar 128 having stops 129 thereon.

Figure 2:
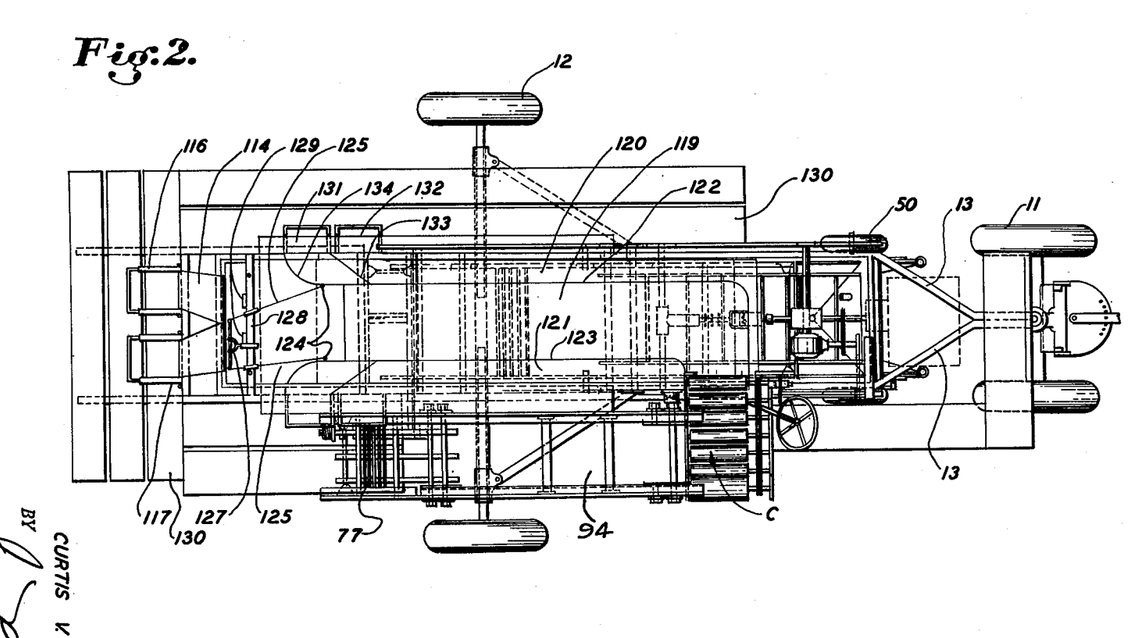
Fig. 2 is a plan view corresponding to Fig. 1.

The swinging guide members 125 provide a shifting outlet for the central lane 119 of the conveyor adapted to communicate with the chute 114 or with the chute 115. In Figure 2, the swingable guide members 125 are shown in the position to direct the potatoes into a sack carried by the holder 117. During the filling of this sack, the previously filled sack is removed from the holder 116 and a new sack is connected thereto. When the sack carried by the sack holder 117 is filled, the operator lifts the forward end of the lever 127 from engagement with a stop 129 and shifts it along the bar 128 to a position beyond the other stop 129, thereby swinging the guide members 125 into a position to direct potatoes into the chute 114.

A platform 130 is extended along the sides and across the rear of the chassis 10 on which workers may stand in order to perform the operations of inspecting, sorting, removing debris, and sacking the potatoes. The side lanes 120 and 121, which are segregated from the main or central lane 119 by the guide walls 122 and 123, may be selectively employed to receive any objects which the sorters are required to remove from the central lane 119, such objects consisting of rocks, clods, or potatoes of designated size. These side lanes 120 and 121 lead rearwardly to chutes 131 and 132, and gates 133 may be provided between the mouths of the chutes 131 and 132. When these gates 133 are positioned so as to close the mouths of the chutes 132, materials carried along by the conveyor 110 in the lanes 120 and 121 will be deflected outwardly by the laterally deflected rear end portions 134 of the walls 122 and 123 into the chutes 131. When the gates 133 are swung into diagonal position wherein the swinging ends thereof engage the walls 122 and 123, they will deflect objects carried by the conveyor 110 in the lanes 120 and 121 into the chutes 132.

The conveyor 110 runs over rollers 136 and 137 and the upper portion thereof between the rollers 136 and 137 is supported by longitudinal bars 138. The lower or return portion of the conveyor is supported by roller means 139. The conveyor 110 is operated by driving the roller 136, this being accomplished through use of a sprocket 140 which is fixed on a shaft 141 which projects from the roller 136. This sprocket 140 is driven by a chain 142 which engages a sprocket 143 supported on the chassis 10. The sprocket 143 is mounted on a shaft 144 driven by a gear 145 which in turn is driven by a pinion 146 fixed on the jack shaft 92. The chain 142 runs over the top of the sprocket 140 and then under a sprocket 147 which is fixed on the far end of a shaft 148. The chain 142 is then extended over and around an idler sprocket 149 and from this sprocket 149 returns to the sprocket 143.

On the near end of the shaft 148 a sprocket 150 is fixed, this sprocket 150 driving a chain 151 extending over a sprocket 152 fixed on an end of the shaft 99 which supports sprockets 98 around which the upper end of the belt element 95 of the elevator 94 is carried, the result being that the chain 142 drives both the elevator 94 and the conveyor 110.

The invention further provides means for quickly lifting the digging mechanism at the will of the operator, whenever he preceives that soil conditions or objects in the path of travel of the harvester require that the digging mechanism be elevated either partly or fully. This lifting mechanism is hydraulically actuated by hydraulic fluid under pressure from a pump 153 driven by a drive connection 154 from the engine 14. The lever 62 is fixed on the shaft 63, and from this lever 62 a lever 155 extends forwardly. Also fixed on the shaft 63 there is a lever 155a which is substantially a duplicate of the lever 155. The forward ends of the levers 155 and 155a are connected to the upper ends of adjustable lifting links 156, the lower ends of which are pivotally connected at 157 to the side portions of the digger frame 27. A hydraulic cylinder piston mechanism, or jack, 158 has its rearward end 159 swingably connected to the chassis 10 and has its forward end connected by pivot means 160 to the lower portion of the lever 62. The hydraulic jack 158 is connected by piping 161 with a hydraulic control valve mechanism 162 and a control lever 163 is provided for operation of the valve mechanism 162 whereby hydraulic fluid under pressure may be directed through the piping 161 to the hydraulic jack 158 to accomplish a swinging of the lever 62 forwardly and to swing the levers 155 and 155a upwardly. The movement of the lever 62 by the jack 158 will be transmitted by the block 61 and thrust bearing means 60 through the rod 59 to the levers 57, so as to swing the lever 56 upward. At the same time the upward movement of the levers 155 and 155a will be transmitted through the links 156 to the frame 27 of the digger mechanism, the result being that the digger mechanism and the depth control wheels will be simultaneously swung upwardly, the distance which these parts are moved upwardly depending upon the degree to which the jack 158 is expanded. It will be perceived that when the links 156 are moved upward so as to lift the frame 27 of the digger mechanism and the pivot pin 157 thereof which engage the side members 52 of the depth control means, the levers 56 will be swung upwardly so that the rear ends of the side members 52 will be simultaneously raised at such rate with relation to the upward movement of the pivot pins 151 that the points of the digger bits 29 will travel upward at a faster rate than the wheels 50. As shown by the fragmentary view 13, a concave roller 50b is at times used instead of the wheels 50 previously described. This roller 50b is carried by a transverse shaft 185 supported below the forward portion of the U-shaped member 53 by brackets 186. This roller 50b serves the same purpose as the wheels 50 and in addition thereto rolls down the potato vines and breaks up clods. This roller 50b is wide enough to cover the potato hill or ridge 187 and will flatten the vines 188. In addition to this, the roller will break up any hard crust at 189 and break up heavy clods, thereby contributing to the facility of separating the potatoes from the clods, or soil. As the flexible grid conveyor 30 travels up the digger frame 27, it is given a shaking movement by a plurality of toothed cams which are rotatably supported in position to engage the edges of the portion of the grid conveyor 30, thereby intermittently raising and dropping the grid conveyor 30 in a manner to shake the load carried thereon and thereby cause clods and debris to drop through the grid conveyor 30.

The front wheels 11 of the device are mounted on an axle 165 which swings on a vertical post 166 under the front portion of the chassis 10. The rear wheels 12 are supported by steering knuckles 167 which are connected to the outer ends of bars 168 which slide into the ends of a stationary axle tube 169 connected to the chassis 10. The front ends of the levers 170 of the steering knuckles 167 are connected by bars 171 to the ends of a tubular transverse steering bar 172. Bolts 173 and 174 are provided to connect the members 168 with the tube 169 and to connect the bars 171 with the transverse bar 172. The bars 168 may be shifted so as to change the spacing between the wheels 12, and spaced openings 175 are provided in the bars 168 through which the bolts 173 may be passed in different adjustments of the bars 168 relatively to the axle tube 169. When a wheel 12 is shifted inwardly or outwardly, the bar 171 associated therewith will be shifted in a like manner relatively to the ends of the bar 172, and the bolts 174 will be repositioned in openings 176 provided in the end portions of the bar 172. An intermediate portion of the bar 172 is connected by means of a clamp 177 to the transverse portion of a cable 178 which extends around pulleys 179, supported on the chassis 10, to hinged connections 180 mounted on a plate 181 which is connected to the vertical post 166 supporting the axle 165 of the front wheels 11. When the front wheels 11 are turned, by swinging the axle 165 around the axis defined by the posts 166, the cable 178 will be shifted and the shifting of the cable 178 will be transmitted through the clamp 177 to the transverse bar 172, whereby the wheels 12 will be swung on the knuckles 167 in a direction opposite that to which the front wheels have been turned. The wheels 11 are of such size that they may swing entirely under the forward portion of the chassis 10, but after the cable 178 has been shifted so as to carry the levers 170 of the steering knuckles 167 to the limit of their angular travel, no further movement of the cable 178 will be caused by the swinging of a wheel 11 toward and into a position directly under the forward end of the chassis 10 for the reason that when the axle 165 of the front wheels 11 is swung 45 degrees in either direction from transverse position, one or the other of the pivotal connections 180 will travel over center and no more movement of the cable will be thereby produced. To accomplish this result, the pivotal connections 180 for the front ends of the cable 178 are disposed on radial lines 182 which are positioned at angles X of substantially 45 degrees from a longitudinal line 183 through the steering axis defined by the post 166. Therefore, when a pivotal connection 180 moves forward through this angle X, it will pass over the center line 183.

I claim:

1. In a potato harvester, a mobile chassis, crop-digging means mounted on the chassis for gathering the potatoes and vines, a conveyor mounted on the chassis and extending to a point adjacent said digging means so as to receive potatoes and vines therefrom, means on said chassis for driving said conveyor so as to convey the potatoes and vines away from said digging means, vine-engaging means mounted on the chassis immediately above said conveyor so as to engage vines thereon, means for driving said vine-engaging means faster than said conveyor, vine-grasping means mounted on the chassis rearwardly of said conveyor and said vine-engaging means, there being a space between said vine-grasping means and said conveyor, and means on said chassis for driving said vine-grasping means so as to carry the vines away from the potatoes while the latter fall downwardly through said space between the conveyor and vine-grasping means.

2. The invention set forth in claim 1, further characterized by a receiver below said space to receive the potatoes.

3. The invention set forth in claim 1, further characterized by said conveyor comprising an endless element having an upper rearwardly movable crop-conveying run, and said vine-engaging means including an endless element having vine-engaging fingers, and means supporting said vine-engaging means on the chassis so that the fingers extending downwardly from the lower run of said vine-engaging means engage the vines on said crop-conveying upper run of the conveyor.

4. The invention set forth in claim 1, further characterized by said vine-grasping means comprising a pair of rollers carried on the chassis rearwardly of said conveyor, one roller being spaced rearwardly of said conveyor and the other roller being disposed above and forwardly of said one roller.

5. The invention set forth in claim 4, further characterized by means on the chassis for driving said rollers in opposite directions, portions of said other roller adjacent said conveyor moving generally in the same direction as said conveyor.

6. The invention set forth in claim 4, further characterized by said driving means for the vine-grasping means including means for driving said rollers at a speed greater than the rate of movement of said conveyor.

CURTIS V. EDWARDS.

REFERENCES CITED

The following references are of record in the file of this patent:

UNITED STATES PATENTS

| Number | Name | Date |
| --- | --- | --- |
| 534,403 | Mechwart | Feb. 19, 1895 |
| 796,017 | Rose | Aug. 1, 1905 |
| 1,020,524 | Todd | Mar. 19, 1912 |
| 1,087,153 | Todd | Feb. 17, 1914 |
| 1,650,753 | Jasperson | Nov. 29, 1927 |
| 1,715,218 | Wright | May 28, 1929 |
| 1,789,527 | Larinan | Jan. 20, 1931 |
| 1,800,622 | Granberg | Apr. 14, 1931 |
| 2,081,346 | Altgelt | May 25, 1937 |
| 2,114,263 | Heaslet | Apr. 12, 1938 |
| 2,209,282 | Rodin | July 23, 1940 |
| 2,215,516 | Schooler | Sept. 24, 1940 |
| 2,277,450 | Parr | Mar. 24, 1942 |
| 2,318,194 | Brown | May 4, 1943 |
| 2,365,077 | Hertzler et al. | Dec. 12, 1944 |
| 2,452,418 | Zuckerman | Oct. 26, 1948 |